United States Patent
Goodfellow Jones

(10) Patent No.: US 11,987,367 B2
(45) Date of Patent: May 21, 2024

(54) TYPE 8 HEATER MAT

(71) Applicant: GKN Aerospace Services Limited, Redditch (GB)

(72) Inventor: Stephen Goodfellow Jones, Redditch (GB)

(73) Assignee: GKN Aerospace Services Limited, Redditch (GB)

( * ) Notice: Subject to any disclaimer, the term of this patent is extended or adjusted under 35 U.S.C. 154(b) by 846 days.

(21) Appl. No.: 17/043,749

(22) PCT Filed: Apr. 5, 2019

(86) PCT No.: PCT/GB2019/051013
§ 371 (c)(1),
(2) Date: Sep. 30, 2020

(87) PCT Pub. No.: WO2019/193367
PCT Pub. Date: Oct. 10, 2019

(65) Prior Publication Data
US 2021/0031929 A1 Feb. 4, 2021

(30) Foreign Application Priority Data
Apr. 5, 2018 (GB) .................................. 1805654

(51) Int. Cl.
*B64D 15/12* (2006.01)
*B32B 27/08* (2006.01)
(Continued)

(52) U.S. Cl.
CPC .............. *B64D 15/12* (2013.01); *B32B 27/08* (2013.01); *B32B 27/20* (2013.01); *B32B 27/285* (2013.01);
(Continued)

(58) Field of Classification Search
CPC ............ B64D 15/12; B64D 2033/0233; B32B 27/08; B32B 27/20; B32B 27/285; H05B 3/18; H05B 2203/013
See application file for complete search history.

(56) References Cited

U.S. PATENT DOCUMENTS

| 5,237,155 A | 8/1993 | Hill |
| 5,934,617 A | 8/1999 | Rutherford |

(Continued)

FOREIGN PATENT DOCUMENTS

| EP | 1017580 B1 | 8/2004 |
| EP | 2528815 B1 | 3/2017 |

(Continued)

OTHER PUBLICATIONS

International Search Report and Written Opinion for PCT/GB2019/051013 dated Jun. 28, 2019 (12 pages).

(Continued)

*Primary Examiner* — Rodney A Bonnette
(74) *Attorney, Agent, or Firm* — Bejin Bieneman PLC

(57) ABSTRACT

An aerospace surface heating apparatus includes opposing layers formed from a thermoplastic containing in excess of 20% by volume of an inorganic filler material, and at least one electrically powered heating element located between the opposing layers. A method for making a heater for an aerospace component includes forming an electrical heating element on a layer of glass fiber reinforced thermoplastic film substrate, applying two opposing thermoplastic layers on opposing sides of the intermediate layer, and applying heat and pressure to the layers to join the layers together, in which the thermoplastic material contains an inorganic filler material.

14 Claims, 3 Drawing Sheets

(51) Int. Cl.
  *B32B 27/20* (2006.01)
  *B32B 27/28* (2006.01)
  *B32B 37/20* (2006.01)
  *B32B 38/00* (2006.01)
  *C23C 4/129* (2016.01)
  *H05B 3/18* (2006.01)

(52) U.S. Cl.
  CPC ........ *B32B 37/203* (2013.01); *B32B 38/0004* (2013.01); *C23C 4/129* (2016.01); *H05B 3/18* (2013.01); *B32B 2255/10* (2013.01); *B32B 2262/101* (2013.01); *B32B 2264/107* (2013.01); *B32B 2605/00* (2013.01); *H05B 2203/013* (2013.01); *H05B 2203/017* (2013.01)

(56) References Cited

U.S. PATENT DOCUMENTS

| | | | |
|---|---|---|---|
| 6,194,685 B1 * | 2/2001 | Rutherford | B64D 15/14 |
| | | | 219/548 |
| 6,392,206 B1 | 5/2002 | Laken | |
| 2002/0043525 A1 | 4/2002 | Laken et al. | |
| 2002/0153368 A1 | 10/2002 | Gardner et al. | |
| 2005/0098684 A1 | 5/2005 | Gullerud et al. | |
| 2005/0175825 A1 | 8/2005 | Hansen et al. | |
| 2008/0166563 A1 | 7/2008 | Brittingham et al. | |
| 2013/0001211 A1 * | 1/2013 | Lewis | H05B 3/36 |
| | | | 219/201 |
| 2014/0087617 A1 * | 3/2014 | Ryniers | B32B 37/14 |
| | | | 442/232 |

FOREIGN PATENT DOCUMENTS

| | | | | |
|---|---|---|---|---|
| GB | | 1111992 A | 5/1968 | |
| GB | | 2342266 A | 4/2000 | |
| GB | | 2445458 A | 7/2008 | |
| GB | | 2477339 A | 8/2011 | |
| WO | WO-2018112390 A1 * | | 6/2018 | ............ B29C 70/64 |

OTHER PUBLICATIONS

UKIPO Search Report for GB1805654.9 dated Jun. 12, 2019 regarding claims 20-23 (3 pages).
UKIPO Search Report for GB1805654.9 dated Oct. 5, 2018 regarding claims 1-11 and 24 (6 pages).
UKIPO Search Report for GB1805654.9 dated Jun. 12, 2019 regarding claim 26 (3 pages).
UKIPO Search Report for GB1805654.9 dated Jun. 12, 2019 regarding claim 19 (3 pages).
UKIPO Search Report for GB1805654.9 dated Jun. 12, 2019 regarding claim 12 (4 pages).

* cited by examiner

TYPE 8 HEATER MAT

CROSS-REFERENCE TO RELATED APPLICATIONS

This application is a national stage of, and claims priority to, Patent Cooperation Treaty Application No. PCT/GB2019/051013, filed on Apr. 5, 2019, which application claims priority to Great Britain Application No. GB1805654.9, filed on Apr. 5, 2018, which applications are hereby incorporated herein by reference in their entireties.

BACKGROUND

Aerospace surfaces such as wing leading edges or engine nacelles (or the like) are prone to ice accretion during flight as the cold outer surfaces of the component come into contact with water during flight, landing, taxi, or take-off.

Ice build-up can change the aerodynamic profile or shape of the component thus changing the functionality of the component. This can have disastrous consequences. In an engine nacelle ice may be ingested into the engine again potentially have very serious and dangerous results.

To solve these issues a number of heating systems have been employed in different aircraft. One system involves using hot exhaust gas from the engines which can be directed to the desired surface (for example along the leading edge of a wing). This has the advantage of using the unwanted heat from the exhaust gas. In an alternative arrangement electrical heaters are applied to the aircraft surfaces prone to icing and an electrical current passed through the heaters. The advantage of this system is that it allows complex and distributed heating systems to be deployed around the aircraft. In fact this system has become the industry's preferred solution to ice accretion.

However, a drawback of electrical heating systems is their complexity and power consumption which must be fed from the electrical generators in the engines. Distributing the electrical tracks in particular ways has minimised electrical consumption whilst optimising performance.

SUMMARY

There is provided an aerospace surface heating apparatus, the apparatus comprising at least one electrically operable heating element located between opposing layers wherein the opposing layers are formed from a thermoplastic containing in excess of 20% by volume of an inorganic filler material.

Conventional heating systems provide electrical heaters surrounded by layers that are highly thermally conductive to allow the heat to be conducted to the required surfaces for heat dissipation and thereby causing ice to melt. Use of a polyetheretherketone (PEEK) material is therefore entirely counterintuitive because a principal property of PEEK is its low thermal conductivity, making it unsuitable for an anti-icing application.

However, the inventors have established that a modified thermoplastic may be suitable for such an application. Specifically, the inventors have established that a modified thermoplastic containing in excess of 20% of an inorganic filler material can double the thermal conductivity of the material thereby making the modified material suitable for an aircraft anti-icing application.

The inventors have established that a modified thermoplastic containing between 20% and 40%, or more specifically between 20% and 30%, by volume of an inorganic filler material is particularly applicable in an anti-icing application. This percentage range of inorganic filler provides a balance between the desired thermal properties that are required for the anti- or de-icing application and the required mechanical properties that are also needed for the material to be structurally strong and robust enough for the application. The percentage range represents a balance that conveniently allows a modified thermoplastic to be used.

Different thermoplastic material may be modified according to an invention described herein. However, the inventors have established that polyethertherketone (PEEK), polyaryletherketone (PAEK), or polyetherketoneketone (PEKK), are particularly useful for the anti/de-icing application.

A variety of inorganic fillers may be used to modify the thermoplastic material. However, the inventors have established that that a magnesium silicate material is particularly suitable. More specifically a PEEK modified to contain a magnesium silicate is particularly advantageous in a de/anti-icing application. In some embodiments, the inorganic filler may be a non-conductive inorganic material, with a high thermal conductivity, such as boron nitride.

Advantageously the inorganic filler may be evenly distributed throughout the thermoplastic material so that the thermal and mechanical properties of the modified thermoplastic are uniform across and throughout the material.

The electrical heating for the arrangement may be achieved in a variety of way, for example using copper, copper-alloy, or other electrical tracks or circuits. Advantageously the at least one electrically powered heating element may be in the form of one or more tracks of a copper, or copper-alloy, conductor flame sprayed onto a thermoplastic substrate, which may comprise glass fiber. This provides a number of advantages. For example, flame spraying a copper containing conductor allows a uniform layer of conductive material to be applied across complex and non-uniform geometries. It also allows a very thin layer of copper-alloy or other conductor to be evenly applied. Applying the conductive material to a thermoplastic substrate comprising glass fiber further allows for complex geometries to be used. This is particularly advantageous because complex parts of an aircraft structure can benefit from a de/anti-icing system as described herein.

The one or more tracks may be applied to a substrate of PEEK. For example, the one or more tracks may be applied, or the geometry of the one or more tracks may be generated, using printed-circuit board manufacturing techniques.

The anti/de-icing arrangement described herein may advantageously be formed as a multi-layer arrangement. For example, the apparatus may comprise a first layer arranged for connection to an aircraft structure and a second layer arranged for connection to an erosion shield. The erosion shield protects the outer surface of the arrangement from damage during flight.

The heating element may advantageously be encapsulated in an intermediate layer between the opposing layers. More specifically the intermediate layer may be in the form of a first and second thermoplastic layer on either side of the heating element wherein the thermoplastic layers comprise the inorganic filler material. The heating element is thereby contained between the layers, each layer comprising the modified thermoplastic.

The percentage of inorganic filler material contained in the intermediate layer may be less than the percentage of inorganic filler material in the opposing layers. The thermal properties of the respective layers may be selected to optimise the composite or laminate structure in this way. For example, the percentage of inorganic filler material contained in the intermediate layer may be approximately 20%-30% and the percentage of inorganic filler material in the opposing layers may be approximately 30%. Differential thermal and mechanical properties can thereby be provided for the anti/de-icing structure. In some embodiments, the intermediate layer may comprise glass fiber for reinforcement purposes.

There is provided a method of making a heater for an aerospace component, the method comprising the steps of:
A forming an electrical heating element on a glass-fibre reinforced thermoplastic film substrate;
B applying two opposing thermoplastic layers on opposing sides of the heating element; and
C applying heat and pressure to the layers to join the layers together; wherein the thermoplastic material contains an inorganic filler material.

The thermoplastic material may advantageously contain in excess of 20% of an inorganic filler material as described herein. For example, as also described herein the thermoplastic material may be polyetheretherketone (PEEK), polyaryletherketone (PAEK), or polyetherketoneketone (PEKK), and the inorganic filler material may be magnesium silicate.

The layers may be formed in batch processes as discrete components which may then be assembled. However, advantageously the thermoplastic layers may be formed as a continuous process. For example, a continuous roller arrangement may be provided to form and roll the thermoplastic material into rolls for later use. Forming thermoplastic material into rolls will be understood by a person skilled in the art of manufacturing plastics. The thermoplastic material is modified as described herein for a de/anti-icing application, and the forming process may include the introduction of the electrical heater layer. A rolled thermoplastic layer may thereby be provided incorporating the electrical heater which is formed on the flexible glass fiber layer.

In such an arrangement a length of heater may be cut into a predetermined length from the continuous process.

As described herein the electrical heating element may be formed on a thermoplastic substrate comprising glass fiber by a flame spraying process. This allows for a thin electrically conductive layer to be formed on a flexible surface which conveniently allows for a continuous manufacturing process.

Viewed from yet another aspect there is provided a heater apparatus comprising an electrically operable heating element encapsulated in a layer of a thermoplastic, wherein the thermoplastic comprises in excess of 20% of an inorganic filler material.

There is provided a multi-layer aero-surface heating apparatus comprising an inner layer of thermoplastic material and two opposing outer layers of thermoplastic material, the inner layer comprising an electrically operable heating element, wherein the inner layer of thermoplastic material contains an equal or lower percentage of an inorganic filling material than the two opposing outer layers.

As described herein, the inner layer may comprise approximately 20%-30% of an inorganic filler and the outer layers may comprise between 20% and 30% of the same inorganic filler material.

Aspects of the heating apparatus described herein extend to aircraft aerodynamic surfaces comprising the heating apparatus. For example, the aircraft aerodynamic surface may form part of one of a wing, a nacelle, a rotor blade, a stabilizer, or a tail.

There is provided a multi-layer circuit board comprising an inner layer of thermoplastic material and two opposing outer layers of thermoplastic material, the inner layer comprising an electrical track forming an electrically operable heating element, wherein the inner layer of thermoplastic material contains an equal or lower percentage of an inorganic filling material than the two opposing outer layers.

Any reference to prior art documents in this specification is not to be considered an admission that such prior art is widely known or forms part of the common general knowledge in the field. As used in this specification, the words "comprises", "comprising", and similar words, are not to be interpreted in an exclusive or exhaustive sense. In other words, they are intended to mean "including, but not limited to". The invention is further described with reference to the following examples. It will be appreciated that the invention as claimed is not intended to be limited in any way by these examples. It will also be recognised that the invention covers not only individual examples but also combination of the embodiments described herein.

The various examples described herein are presented only to assist in understanding and teaching the claimed features. These examples are provided as a representative sample of examples only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the spirit and scope of the claimed invention. Various examples of the invention may suitably comprise, consist of, or consist essentially of, appropriate combinations of the disclosed elements, components, features, parts, steps, means, etc, other than those specifically described herein. In addition, this disclosure may include other inventions not presently claimed, but which may be claimed in future.

DETAILED DESCRIPTION

A heating apparatus described herein relates to heating surfaces of aircraft or aerodynamic surfaces. A particular surface that requires heating is the leading edge of the wings of aircraft.

Figure 1:
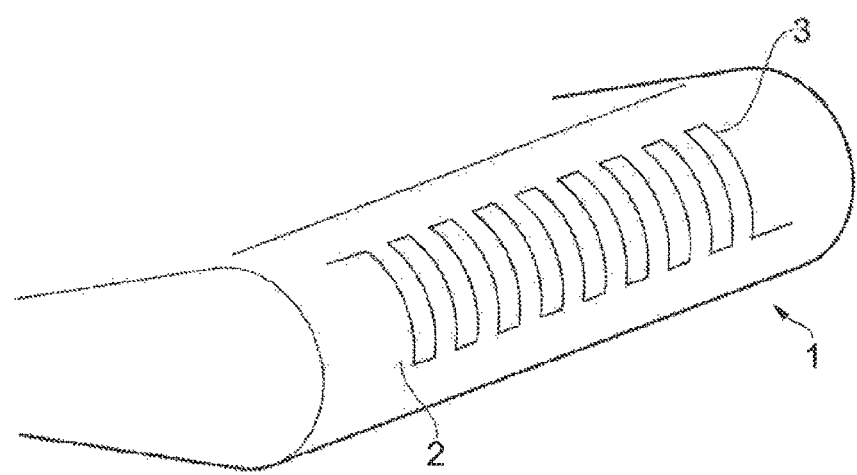
FIG. 1 shows a schematic of leading edge of an aircraft wing.

FIG. 1 shows a simple schematic of the general shape of the leading edge of a wing 1. As the wing passes through the air at speed the wing cools to very low temperatures. Water vapour impinging on the wing surface 2 is prone to freezing creating a layer of ice on the outer surface of the wing.

To prevent ice build-up an electrical heater may be incorporated into the wing surface as illustrated by the electrical track 3. The track can be positioned beneath the erosion shield which is located on the very front surface of the wing 1. An electrical current can then be passed through the track causing the track to heat and conduct heat to the leading edge. Ice build-up can then be prevented. This is the general arrangement of conventional de-icing systems used in modern aircraft.

Conventional de-icing arrangements are manufactured by manually laying up an electrical heating element onto a resin impregnated material, putting onto a mould. The assembly is then placed into an autoclave and heated for a predetermined period of time to cure the element into the material. A heating component can then be formed using this batch-type process.

An unconventional laminate or layered structure can be used for an electrically powered heated which can be integrated into aero-surfaces such as a leading edge illustrated in FIG. 1. Specifically, the layered structure surrounds a flexible heating element which may then be conveniently shaped to match the contours and profile of the surface to be heated.

Figure 2:
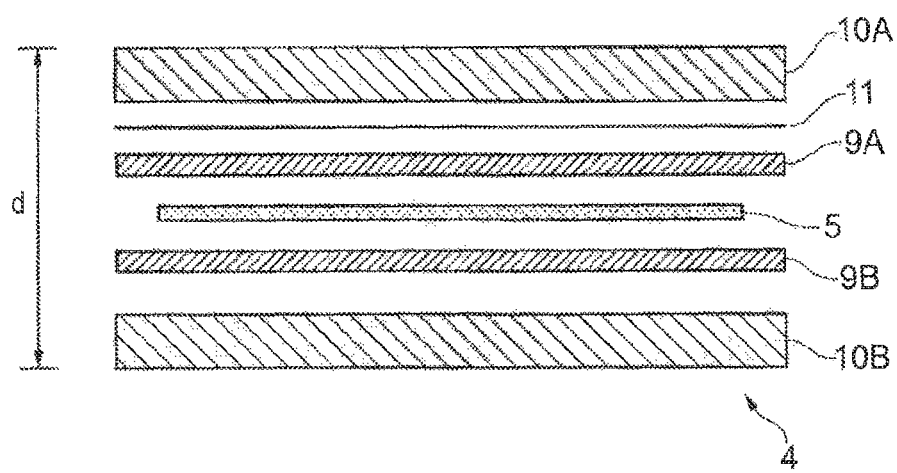
FIG. 2 shows an exploded view of a heater apparatus.

Referring to FIG. 2, the laminate structure can be seen in an exaggerated exploded cross-section.

Figure 3:
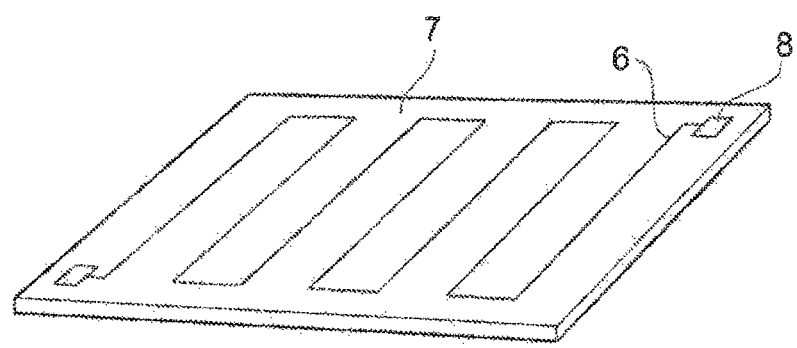
FIG. 3 shows a flame sprayed heating layer.

Centrally located in the multi-layer laminate structure is the heating element 5. Referring to FIG. 3 the layout of the heating element layer 5 is shown. The heating element is in the form of a conductive electrical track or element 6 such as, for example, copper or a copper-alloy. This conductive track may be formed in a variety of ways but may advantageously be formed by flame spraying copper-alloy onto a thermoplastic (such as PEEK) substrate 7 comprising glass fiber.

Connection terminals 8 are shown which may be electrically connected to a control circuit (not shown) which in turn may be electrically connected to the electrical generators of the aircraft.

Returning to FIG. 2 the central heating element layer 4 is positioned or sandwiched between two opposing layers 9A and 9B of a thermoplastic. A thermoplastic advantageously allows for re-working if there are difficulties during manufacture since the material can be heated and softened and moulded into the desired shape. As shown with reference to FIG. 1 the contours can be quite complex and extreme in aero-structures.

Suitable materials for the thermoplastic include polyaryletherketone (PAEK), or polyetherketoneketone (PEKK). A particularly suitable material for the thermoplastic is polyetheretherketone, more commonly known as PEEK. PEEK demonstrates strong mechanical strength and durability and is also chemically stable relating to existing patent WO2011092482A1BV PEEK, PEKK, PPS, PES.

However, as discussed below, there are significant problems with using PEEK in a conventional form.

Returning again to FIG. 2, the outer surfaces of the laminate are formed of two additional opposing outer layers 10A and 10B. These layers are also formed from a thermoplastic and again more specifically they may be formed from PEEK.

A copper or copper-alloy ground layer 11 may also be incorporated for defect detection, i.e., its main use is fault detection for in service operation.

As described above FIG. 2 is an exaggerated exploded cross-section. The actual depth d of the layer as shown in FIG. 2 may be in the region of 500 micro-meters. This thickness advantageously allows for complex geometries to be followed by the heater which is discussed further below.

As discussed above, although PEEK advantageously has good mechanical and chemical properties, there are problems with employing PEEK in a conventional form in an electrical heating application.

First, PEEK has low thermal conductivity, and this means PEEK acts as an insulator. A requirement of a heating system is the conduction or dissipation of heat from the electrical element. Thus, PEEK is not normally a material which can be used. However, the filler approximately doubles the thermal conductivity. Although PEEK could be used without a filler, it would not be able to support the same power densities. This would restrict the design window and potential applications.

Second, PEEK is a very smooth material once it has been formed i.e. the outer surface has a low average surface roughness. This make connecting PEEK to other surfaces difficult, i.e., PEEK will not bond to metal or other surfaces easily.

Third, the coefficient of thermal expansion (CT) of PEEK is high, meaning that in an application where a structure's temperature will change and where different materials having different coefficients of thermal expansion are adjacent to each other, separating forces are created as the materials expand and contract at different rates. This can cause delamination of laminated structures or shape distortion in assembly.

A modified composition of PEEK can address these issues and allow PEEK to be employed in a heater structure and specifically an aero-structure heating apparatus.

The PEEK comprises an inorganic filler component, i.e., the normally pure PEEK is blended with an inorganic material that acts as a filler material. Advantageously the inorganic filler may be magnesium silicate (commonly known as talc) or a boron nitride.

By blending PEEK with an inorganic filler such as talc the thermal properties of PEEK can be modified. In effect the mineral in the filler allows heat to be transmitted more easily through the material. Because the inorganic filler is not an electrical conductor the electrical integrity of the PEEK is advantageously maintained.

The inventors have also established that a careful balance is required. With no inorganic filler the coefficient of thermal expansion is too high causing delamination. With too great a proportion of filler the mechanical and chemical properties of PEEK are lost.

By selecting a specific proportion of filler the inventors have established that the following can be simultaneously achieved:
 (i) electrical insulation properties of PEEK can be maintained, preventing any short circuits from the electrical heating elements (the tracks);
 (ii) the coefficient of thermal expansion can be modified and brought much closer to that of metals, such as aluminium, which are commonly used for aircraft structures and aero-surfaces;
 (iii) the heat conducting properties of PEEK can be improved to allow heat to pass from the electrical heating element through the material to the surface adjacent to the heating apparatus; and
 (iv) the adhesive bond-strength of the PEEK to epoxy adhesives is significantly improved, when combined with a suitable surface preparation process, improving the overall mechanical robustness of the assembly.

The inventors have established that the percentage of inorganic filler that should be blended with the PEEK is in excess of 20% and not exceeding 40%.

At 30% the coefficient of thermal expansion has been found to be well matched to metal structures, which is advantageous in the manufacturing of complex bonded shapes comprising both composite and metallic materials. Accordingly, in some narrower embodiments, the percentage of inorganic filler that should be blended may be between 20% and 30%.

The blend of PEEK and inorganic filler can be measured in this way: place a sample into a container of fluid and accurately measure the change in the surface height of the fluid to accurately measure the volume of the sample, regardless of its shape, and then take a very precise measurement of the sample's mass. Combined with knowledge of the density of the pure thermoplastic and the pure filler, it is possible to determine the percentage loading from the change in density. For example, the specific gravity of pure PEEK is 1.3; whereas the specific gravity of 30% magnesium silicate loaded PEEK is 1.54.

Returning again to FIG. 2, the outer layers 10A, 10B may be between 20%-40%, or in some embodiments 20%-30%, inorganic filler. The inner layers 9A and 9B may also comprise inorganic filler in the same range. Advantageously the outer layers 10A and 10B may comprise 30% inorganic filler and the inner layers 9A and 9B an equal or lower percentage of inorganic filler but exceeding 20%.

Thus, a non-linear distribution of inorganic filler in a PEEK material is provided through the thickness of the heating apparatus. The precise distribution can be optimized for each application.

Although 4 layers of PEEK are shown in FIG. 2, it will be recognised that further layers may be used with different compositions of PEEK and inorganic filler within the ranges described herein.

Not only does the composition and configuration of a PEEK/inorganic blend allow a heater system to be provided for an aero-surface, there are further synergistic technical advantages including the following:
(i) The speed of manufacturing a heating apparatus can be dramatically increased. More specifically, the conventional batch process can be replaced with a continuous line production where the layers can be applied from rollers and then pressure applied at the appropriate temperature to melt and bond the layers together. In conventional processes material is supplied on a roll, cut to shape, and then assembled with other components. According to an invention described herein parts may be conveniently and advantageously assembled in roll form allowing greater automation.
(ii) The PEEK thermoplastic advantageously allows much thinner heaters to be formed for a given heat output. This not only allows more complex geometries and profiles to be followed but it also reduces the weight of the heating system per unit of thermal output.
(iii) The overall thermal efficiency of the heater can be improved thereby reducing electrical consumption and thus the electrical demands of the de-icing system on the electrical generators of the aircraft.
(iv) The thermoplastic properties of the PEEK/inorganic blend allow for reworking of the material either for maintenance once installed or if there are manufacturing complications.
(v) PEEK can be recycled, providing for compliance with future requirements for recycle-ability of aerospace components.
(vi) The thermal properties of PEEK mean that conventional flame spraying techniques can be used to apply copper, copper-alloy, or other materials directly to its surface.

Overall the heating systems and method described herein provide a significant number of technical and commercial advantages.

A heating apparatus as described herein may be manufactured in a conventional batch type process whereby each layer is layered and then the component heated or cured to bond the multiple layers together. However, the arrangement advantageously lends itself to a continuous process as opposed to a batch process.

Continuous processes include belt press; batch processes include static press or autoclave to achieve consolidation.

For example, the method of making a heating apparatus as described herein may include the steps of:
(A) Forming an electrical heater element on a layer of glass fibre substrate. This may be example be by flame spraying a copper-alloy directly onto a PEEK blended layer or onto glass fiber.
(B) Encapsulating the heater element layer in an intermediate thermoplastic layer. Thus, the heater element is contained within a layer of thermoplastic.
(C) Applying two opposing thermoplastic layers on opposing sides of the intermediate layer. Thus the intermediate layer is itself contained within or sandwiched by two layers of thermoplastic. It will be recognized that once cured or bonded together the layers are all immediately adjacent to one another, thereby giving the appearance of a continuous laminate.
(D) Curing or pressure- and heat-processing the layers to join the layers together.

As described herein, the thermoplastic material contains an inorganic filler material such as a magnesium silicate, thereby providing the technical advantages which are set out above.

The heating system may be applied to any aero-surface that requires heating for de-icing or other purposes including and not limited to:
wing leading edges
Tail leading edges
Landing gear doors
Helicopter rotor blade leading edges
Engine nacelles Although the application described herein relates to de-icing systems for aircraft it may also be applied to applications where heating is required with complex shapes, lower power consumption, and/or very low thickness requirements.

These applications may include automotive, space, floor or space heating, and so forth.

The invention claimed is:

1. An aerospace surface heating apparatus comprising:
opposing layers formed from a thermoplastic containing in excess of 20% by volume of an inorganic filler material; and
at least one electrically operable heating element located between the opposing layers;
wherein the heating element is encapsulated in an intermediate layer between the opposing layers, and the intermediate layer is a first and second thermoplastic layer on either side of the heating element, the thermoplastic layers including an inorganic filler material; and
wherein a percentage of inorganic filler material contained in the intermediate layer is less than a percentage of inorganic filler material in the opposing layers.

2. The aerospace surface heating apparatus of claim 1, wherein the thermoplastic contains between 20% and 30% by volume of an inorganic filler material.

3. The aerospace surface heating apparatus of claim 1, wherein the thermoplastic is polyetheretherketone (PEEK).

4. The aerospace surface heating apparatus of claim 1, wherein the thermoplastic is polyaryletherketone (PAEK).

5. The aerospace surface heating apparatus of claim 1, wherein the thermoplastic is polyetherketoneketone (PEKK).

6. The aerospace surface heating apparatus of claim 1, wherein the inorganic filler material is magnesium silicate.

7. The aerospace surface heating apparatus of claim 1, wherein the inorganic filler material is boron nitride.

8. The aerospace surface heating apparatus of claim 1, wherein the inorganic filler material is evenly distributed throughout the thermoplastic material.

9. The aerospace surface heating apparatus of claim 1, wherein the at least one electrically operable heating element is at least one track of a copper-containing conductor flame sprayed onto a thermoplastic substrate.

10. The aerospace surface heating apparatus of claim 9, wherein the thermoplastic substrate comprises glass fiber.

11. The aerospace surface heating apparatus of claim 1, further comprising a first layer arranged for connection to an aircraft structure and a second layer arranged for connection to an erosion shield.

12. The aerospace surface heating apparatus of claim 1, wherein the percentage of inorganic filler material contained in the intermediate layer is 20-30%, and the percentage of inorganic filler material in the opposing layers is 30%.

13. A multi-layer aero-surface heating apparatus comprising:
- an inner layer of thermoplastic material containing an inorganic filler material;
- two opposing outer layers of thermoplastic material on either side of the inner layer, the two opposing outer layers containing the inorganic filler material; and
- an electrically operable heating element adjacent to the inner layer; and
- wherein the inner layer of thermoplastic material contains a lower percentage of the inorganic filling material than the two opposing outer layers.

14. The multi-layer aero-surface heating apparatus of claim 13, wherein the surface is shaped to form part of one of a wing, a nacelle, a rotor blade, a stabilizer, or a tail.

* * * * *